United States Patent
Kuperman

(10) Patent No.: US 12,098,753 B2
(45) Date of Patent: Sep. 24, 2024

(54) ROLLER CLUTCH ASSEMBLY

(71) Applicant: RevMax Performance, LLC, Charlotte, NC (US)

(72) Inventor: Frank C. Kuperman, Charlotte, NC (US)

(73) Assignee: REVMAX PERFORMANCE, LLC, Charlotte, NC (US)

( * ) Notice: Subject to any disclaimer, the term of this patent is extended or adjusted under 35 U.S.C. 154(b) by 0 days.

(21) Appl. No.: 18/073,872

(22) Filed: Dec. 2, 2022

(65) Prior Publication Data

US 2023/0175559 A1 Jun. 8, 2023

Related U.S. Application Data

(60) Provisional application No. 63/285,691, filed on Dec. 3, 2021.

(51) Int. Cl.
*F16D 41/067* (2006.01)
*F16D 41/066* (2006.01)

(52) U.S. Cl.
CPC ......... *F16D 41/066* (2013.01); *F16D 41/067* (2013.01)

(58) Field of Classification Search
CPC .............................................. F16D 41/066–067
USPC ..................................................... 192/45.016
See application file for complete search history.

(56) References Cited

U.S. PATENT DOCUMENTS

| | | | |
|---|---|---|---|
| 3,904,005 A * | 9/1975 | Husmann ............... | F16D 41/067 192/45.016 |
| 3,954,161 A * | 5/1976 | Ehret .................... | F16D 41/067 192/45.016 |
| 4,368,809 A * | 1/1983 | Husmann ............... | F16D 41/067 192/45.016 |
| 8,579,097 B2 | 11/2013 | Kanai et al. | |
| 9,719,579 B2 | 8/2017 | Torii et al. | |
| 10,948,059 B2 | 3/2021 | Hardin | |
| 2002/0096218 A1* | 7/2002 | Mefford ................. | F16J 15/004 137/557 |
| 2011/0162933 A1* | 7/2011 | Li ......................... | F16D 41/067 192/45.01 |
| 2013/0008757 A1 | 1/2013 | Mizuno et al. | |

* cited by examiner

*Primary Examiner* — Lori Wu
(74) *Attorney, Agent, or Firm* — Seth L. Hudson; Maynard Nexsen PC

(57) ABSTRACT

An roller clutch assembly that includes an outer race with a plurality of cam surfaces circumferentially spaced apart from each adjacent cam surface having a shallow end and a deep end further radially recessed into the outer race and an inner race having circumferentially spaced splines on an inner surface. A roller clutch assembly is disposed adjacent the inner race, and at least two spiral lock snap rings, wherein one spiral lock snap ring is disposed adjacent the outer race.

7 Claims, 17 Drawing Sheets

ROLLER CLUTCH ASSEMBLY

The present patent application claims the benefit of priority of U.S. Provisional Application No. 63/285,691, filed on Dec. 3, 2021, and entitled "ROLLER CLUTCH ASSEMBLY," the contents of which are incorporated in full by reference herein.

FIELD OF THE INVENTION

The present invention relates generally to a roller clutch assembly and more generally relates to an improved roller clutch assembly with a cam gear machined into the outer race, improved roller clutch assembly, and structural components for additional structural support.

BRIEF SUMMARY OF THE INVENTION

According to an embodiment of the present invention, a roller clutch assembly includes an outer race with a plurality of cam surfaces circumferentially spaced apart from each adjacent cam surface having a shallow end and a deep end further radially recessed into the outer race and an inner race having circumferentially spaced splines on an inner surface. A roller clutch assembly is disposed adjacent the inner race, and at least two spiral lock snap rings, wherein one spiral lock snap ring is disposed adjacent the outer race.

According to another embodiment of the present invention, the roller clutch assembly includes a roller clutch assembly having an outer ring and an inner ring composed of metal.

According to yet another embodiment of the present invention, the roller clutch assembly includes an inner retainer plate disposed between the inner race and the spiral lock snap ring disposed adjacent the outer race.

According to yet another embodiment of the present invention, the roller clutch assembly includes an outer race with a plurality of cam surfaces circumferentially spaced apart from each adjacent cam surface having a shallow end and a deep end further radially recessed into the outer race, and a first spiral lock snap ring disposed between the outer race and an inner retainer plate. An inner race having circumferentially spaced splines on an inner surface is positioned adjacent the inner retainer plate and a roller clutch assembly, and an outer retainer plate is positioned adjacent the roller clutch assembly and a second spiral snap ring.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
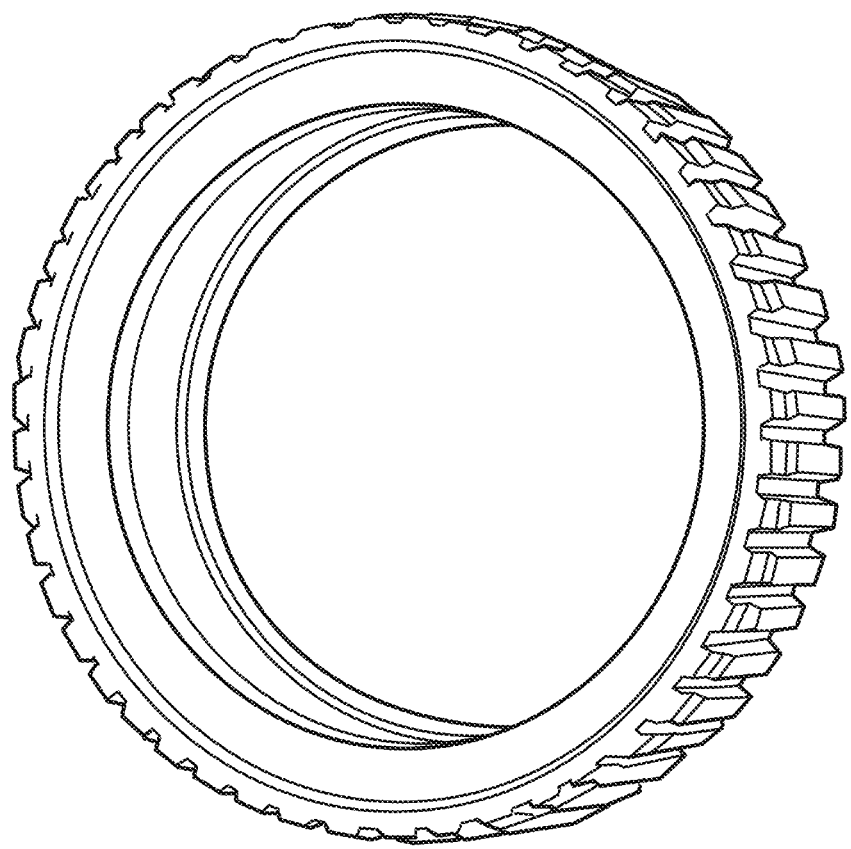
FIG. 1 is a top view of a prior art outer race containing a smooth inner surface.
Figure 2:
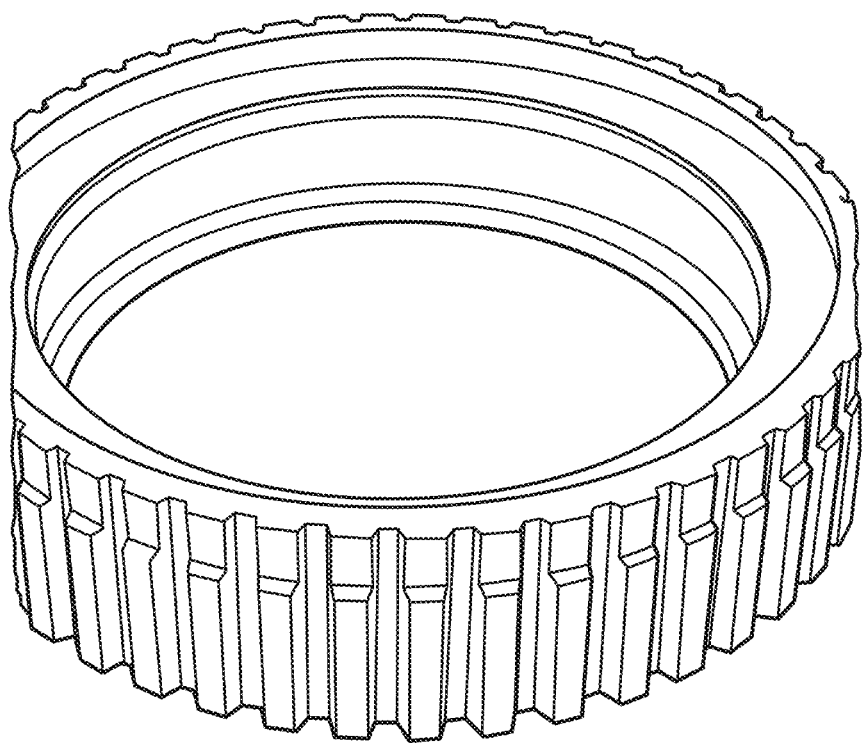
FIG. 2 is a perspective view of a prior art outer race containing a smooth inner surface.
Figure 3:
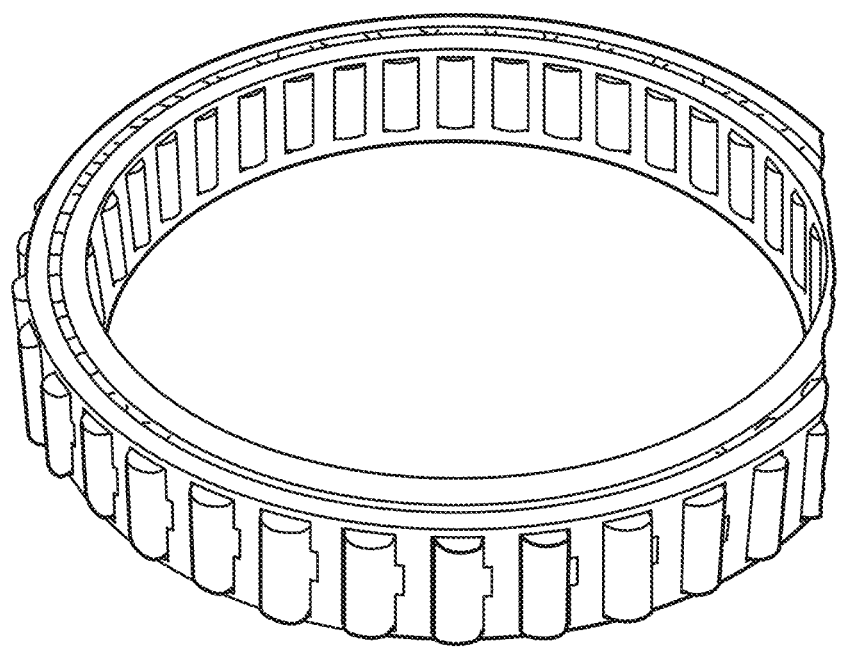
FIG. 3 is a perspective view of a prior art sprag assembly containing a plastic cage.
Figure 4:
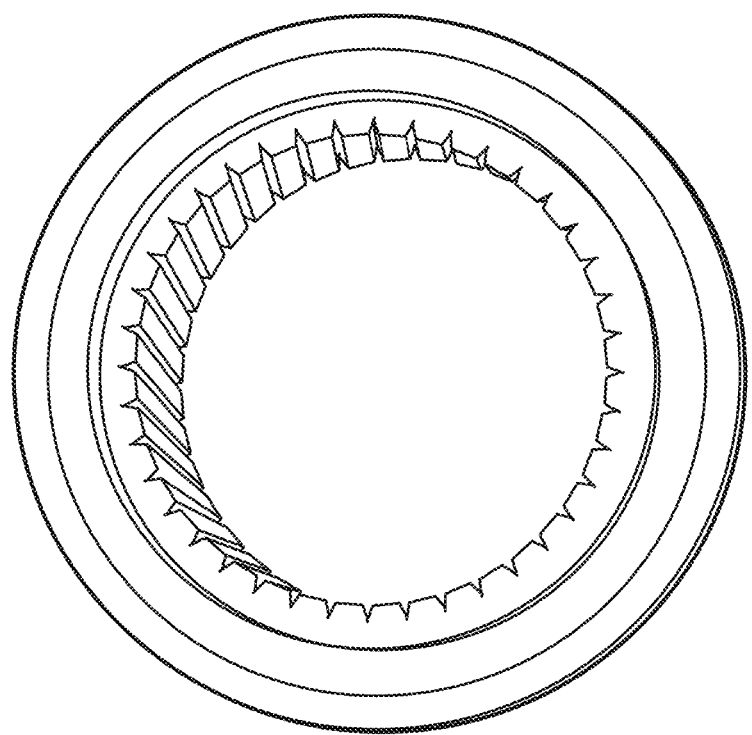
FIG. 4 is a top view of a prior art inner race.
Figure 5:
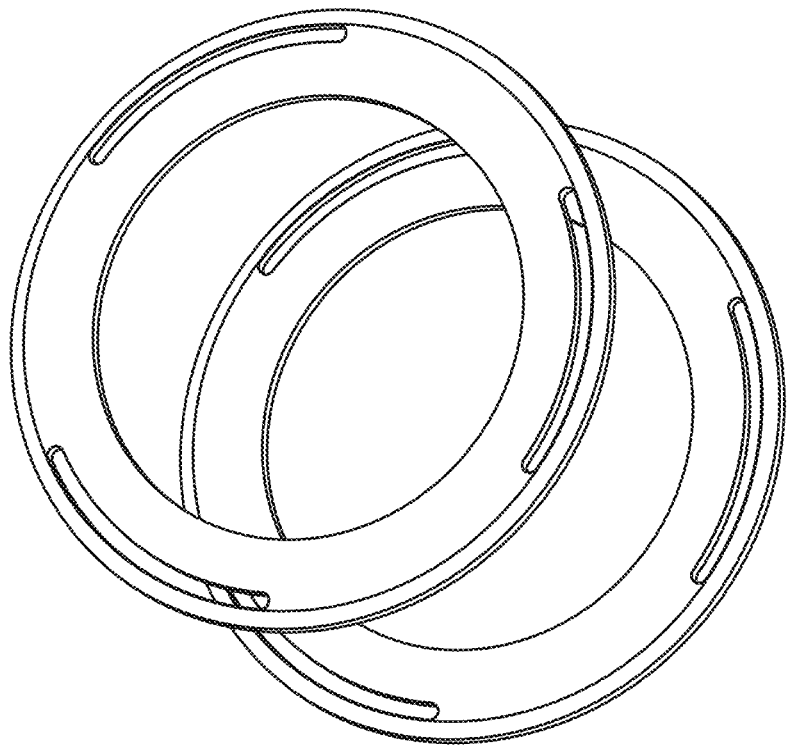
FIG. 5 is a perspective view of prior art retainer plates.

FIGS. 1-5 illustrate component parts to a prior art roller clutch assembly. FIGS. 1-2 show an outer race with a smooth internal surface. A roller clutch assembly is shown in FIG. 3, which includes a cage composed of plastic. A prior art inner face is shown in FIG. 4 with plates shown in FIG. 5. The prior art only uses one standard snap ring within the roller clutch assembly.

Figure 6:
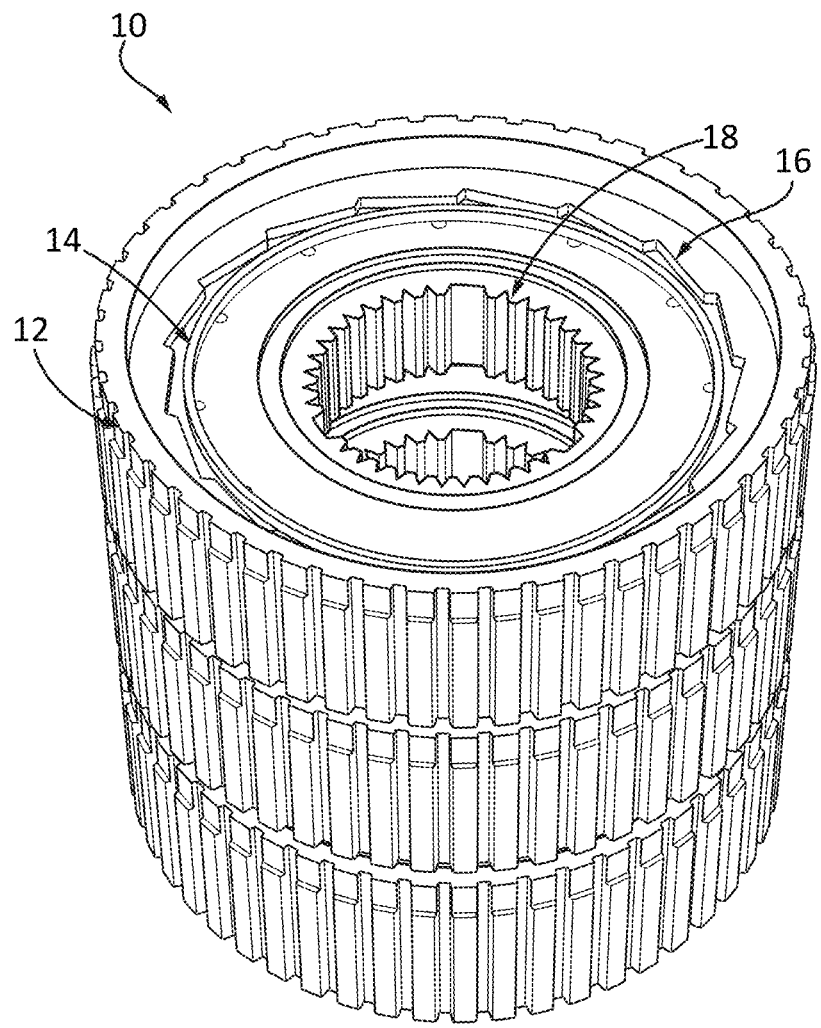
FIG. 6 is a perspective view of a stack of roller clutch assemblies according to the present invention.
Figure 7:
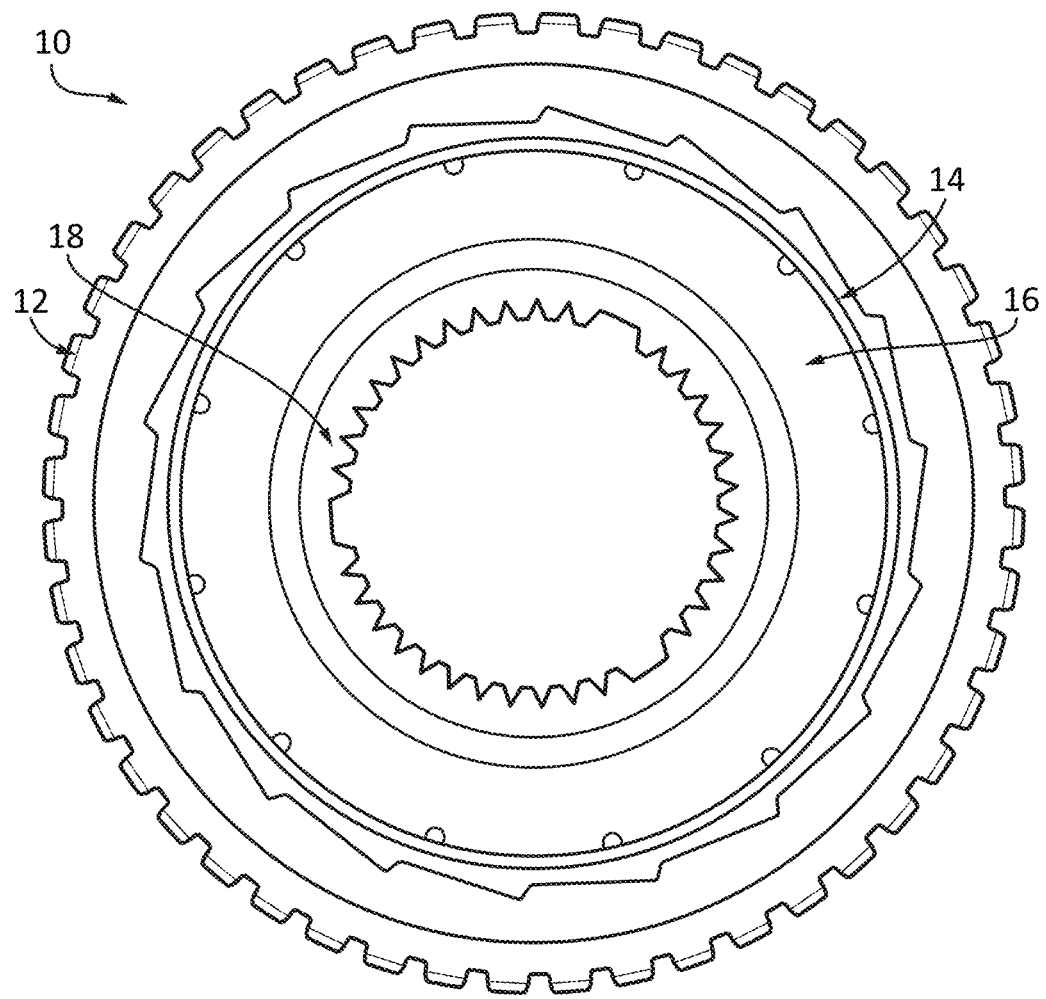
FIG. 7 is a top view of a roller clutch assembly according to the present invention.
Figure 8:
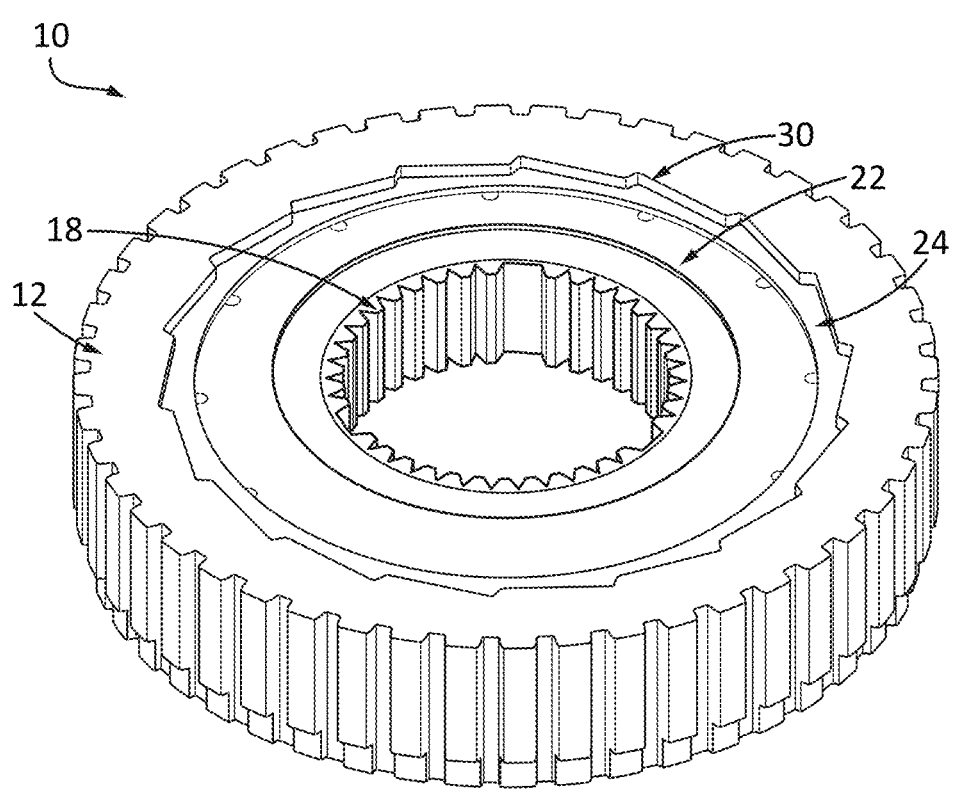
FIG. 8 is a bottom view of a roller clutch assembly according to the present invention.
Figure 9:
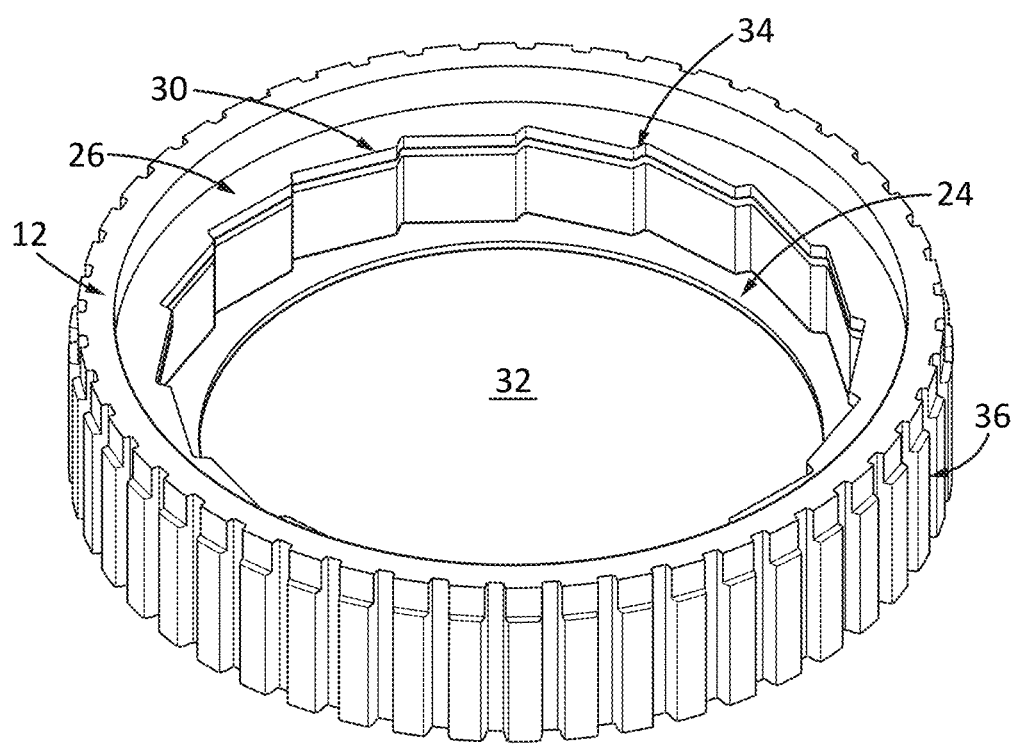
FIG. 9 is a perspective view of an outer race according to the present invention.
Figure 10:
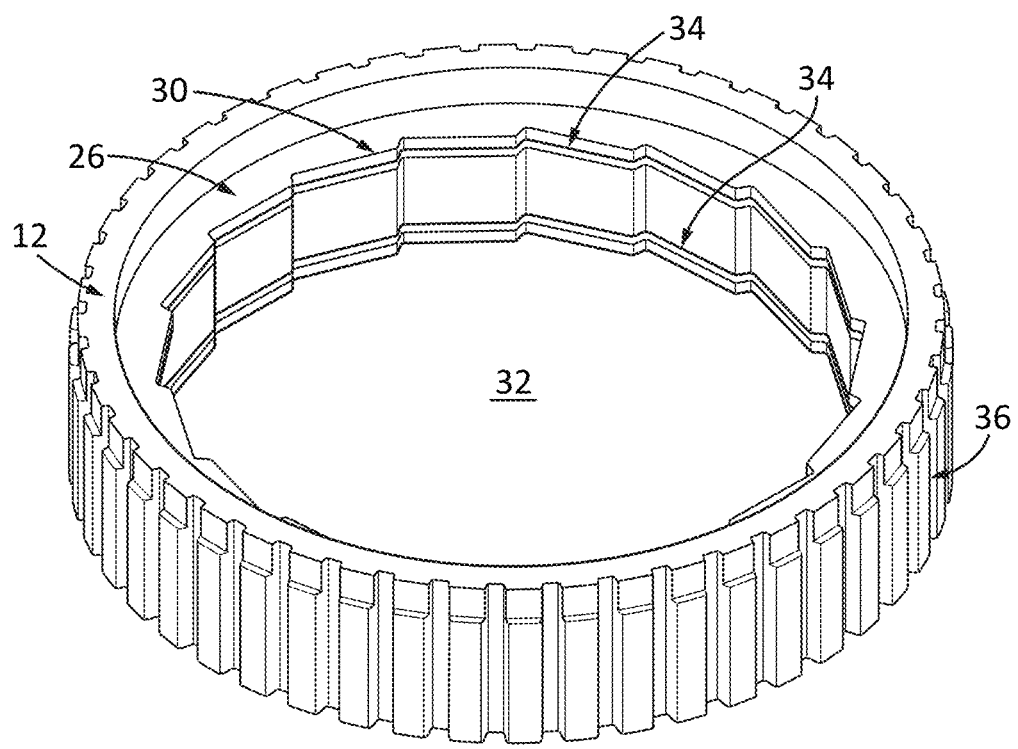
FIG. 10 is another perspective view of an outer race according to the present invention.
Figure 11:
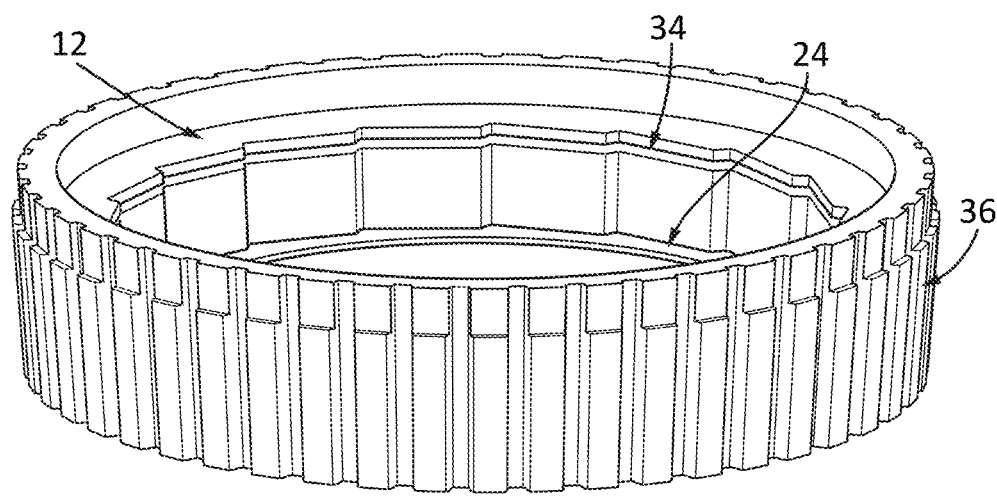
FIG. 11 is another perspective view of an outer race according to the present invention.

Referring now specifically to the drawings, a roller clutch assembly is illustrated in FIGS. 6-8 and shown generally at reference numeral 10. The roller clutch assembly includes an outer race 12, a first spiral lock snap ring 14, an inner retainer plate 16, an inner race 18, a roller clutch assembly 20, an outer retainer plate 22, and a second spiral lock snap ring 24. The inner diameter or inner surface of the outer race 12 includes a shelf 26 and a plurality of cam surfaces 30, as shown in FIGS. 9, 10, and 11. The shelf 26 has a generally circular shape. The shelf 26 is formed on the side portion of the plurality of cam surfaces 30. The shelf 26 is recessed from the outer edge of the outer race 12. A plurality of cam surfaces 30 are also contained on the opposite side of the outer race 12 as shown in FIG. 8. The cam surfaces 30 are circumferentially spaced apart from each adjacent cam surface 30 and has a shallow end and a deep end further radially recessed into the outer race 12. Two slots 34 are disposed within each cam surface 30 that is continuous along the entire circumference of the plurality of cam surfaces 30. A plurality of splines 36 are disposed on the exterior surface of the outer race 12.

Figure 12:
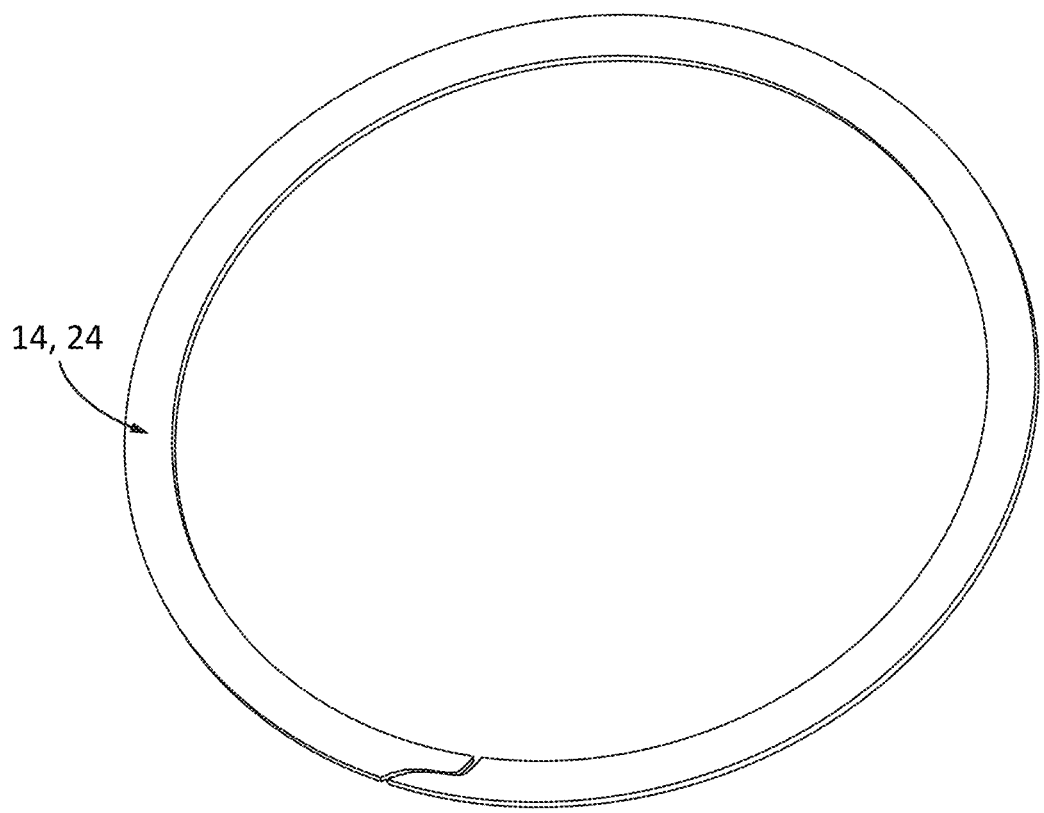
FIG. 12 is a perspective view of a spiral lock snap ring according to the present invention.

The first spiral lock snap ring 14, as illustrated in FIG. 12, is positioned within a slot 34 disposed within each cam surface 30 and extends into the void 32. In other words, the first spiral lock snap ring 14 contains an outer edge that is positioned within the slot 34. The exterior surface of the first spiral lock snap ring 14 is shown in FIGS. 6 and 7, and the interior surface is disposed adjacent the inner retainer plate 16. The exterior surface of the inner retainer plate 16 is shown in FIGS. 6 and 7, and the interior surface is disposed adjacent the inner race 18.

Figure 14:
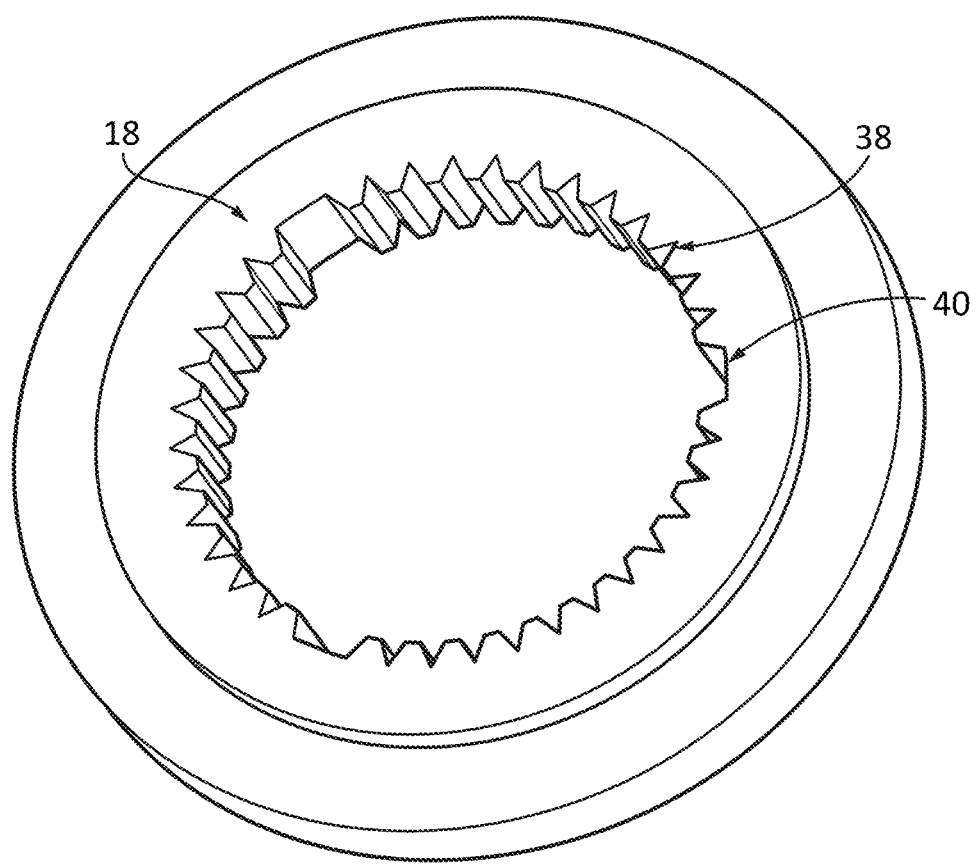
FIG. 14 is a perspective view of an inner race according to the present invention.

As shown in FIG. 14, the inner race 18 is circular with an interior void. The exterior surface of the inner race 18 is generally smooth and the interior surface contains a plurality of teeth 38 circumferentially spaced-apart from each adjacent tooth 38. A seat 40 is dispersed between the teeth 38. As shown in FIG. 14, the inner race 18 may contain seats 40 spaced-apart from each other on the interior surface and dispersed between the plurality of teeth 38. As illustrated, three seats 40 are dispersed between the plurality of teeth 38 and spaced an equal distance apart from each other.

Figure 15:
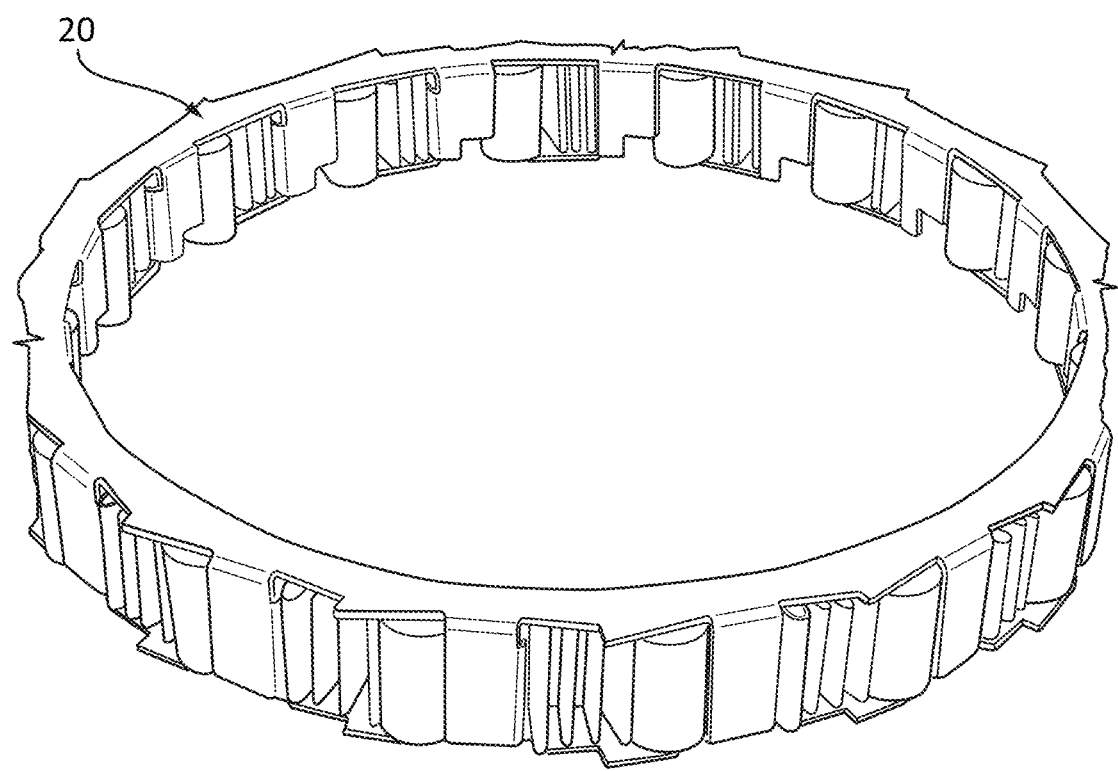
FIG. 15 is a perspective view of a roller clutch assembly according to the present invention.
Figure 16:
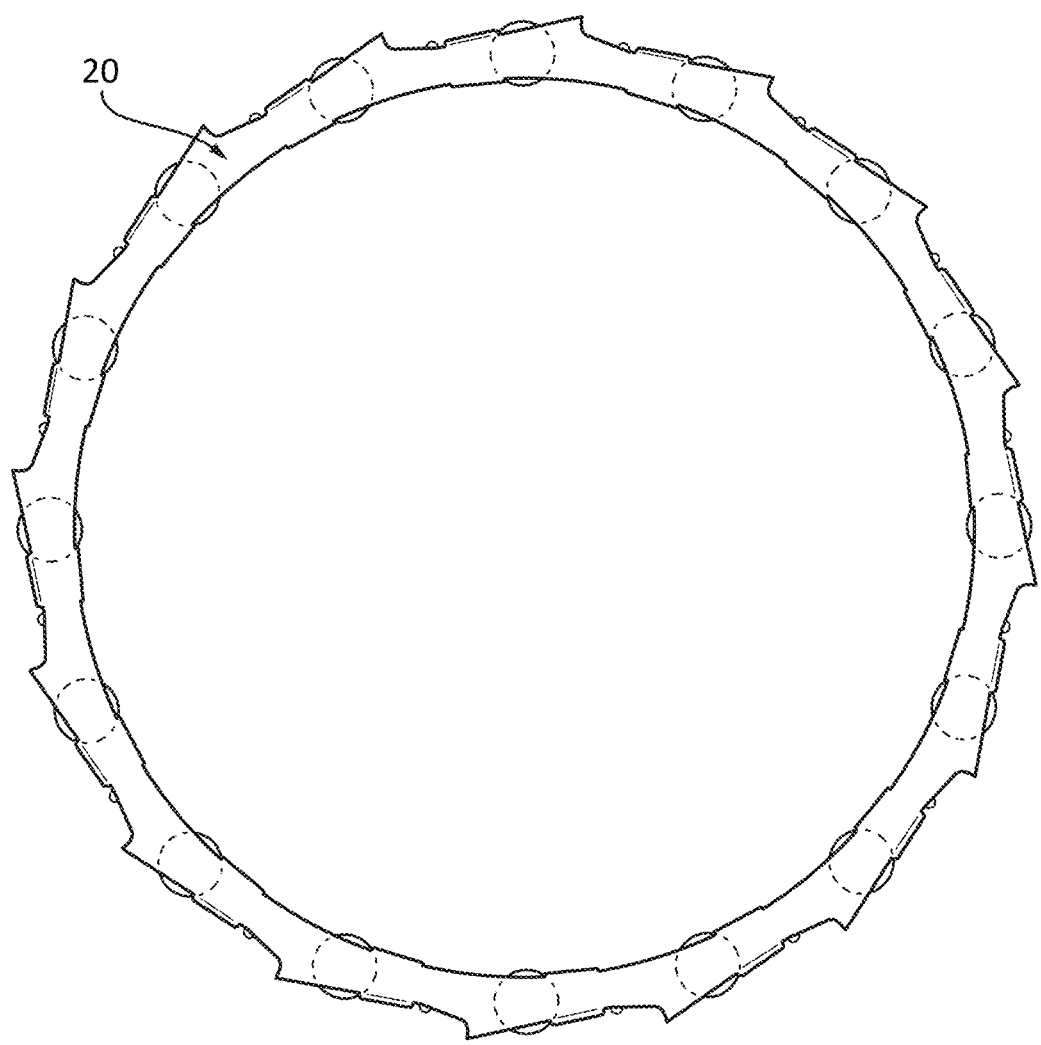
FIG. 16 is a top view of a roller clutch assembly according to the present invention.
Figure 17:
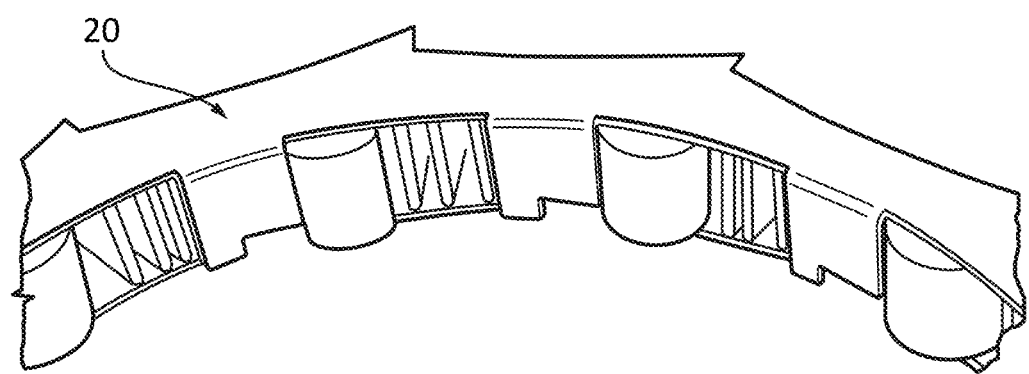
FIG. 17 is a partial view of a roller clutch assembly according to the present invention.

A roller clutch assembly 20 is shown in FIGS. 15, 16, and 17. The roller clutch assembly 20 includes a cage, rollers, and roller springs. The roller clutch assembly 20 is positioned adjacent the inner race 18. The cage is composed of metal, which is different than the prior art cage in FIG. 3. The cage includes an outer ring and an inner ring spaced apart from one another and interconnected by a top portion and a bottom portion axially extending between the outer edges of the outer ring and the inner ring. A plurality of ribs extend from the outer edges of the outer ring in the lateral direction, which are spaced-apart from each other, defining a plurality of windows between each rib. The windows receive rollers and roller springs.

Figure 13:
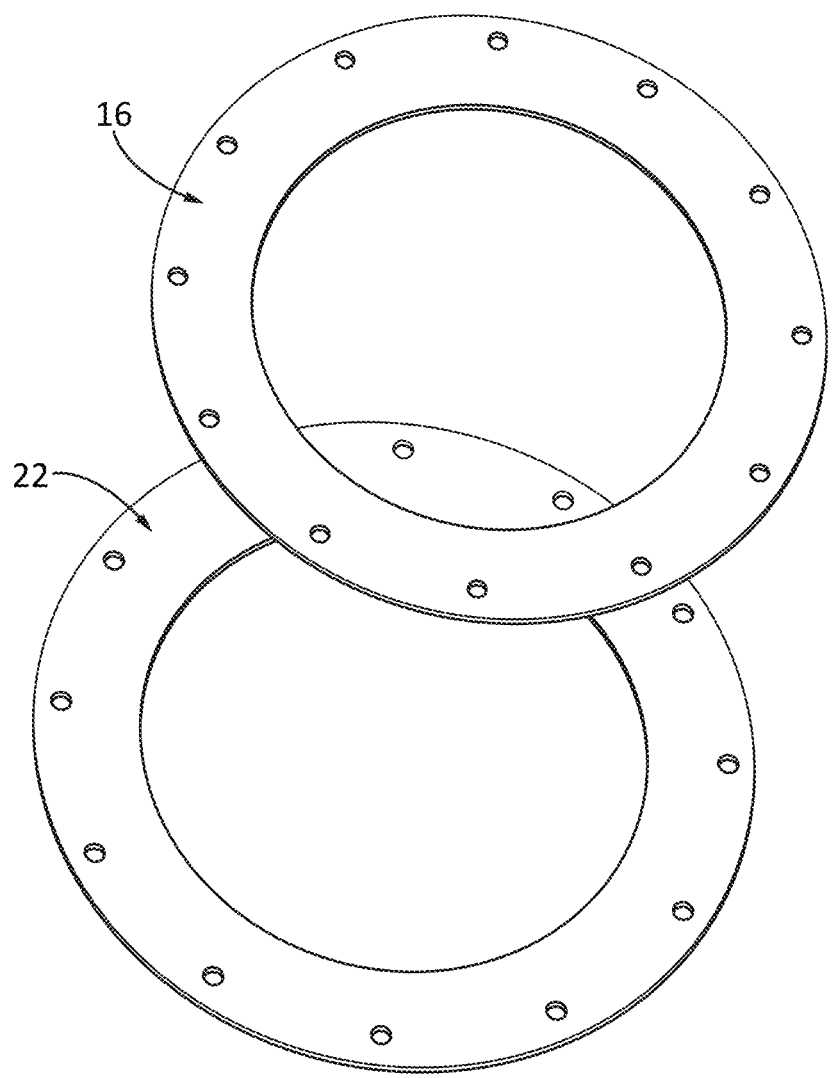
FIG. 13 is a perspective view of the inner retainer plate and the outer retainer plate of the present invention.

An outer retainer plate 22 is disposed adjacent the roller clutch assembly 20 on the opposite side from the inner race 18. A bottom view of the roller clutch assembly 10 is shown in FIG. 8. A second spiral lock snap ring 24 is positioned within the slot 34 disposed within each cam surface 30, as shown in FIGS. 9 and 11. In other words, the second spiral lock snap ring 24 contains an outer edge that is positioned within the slot 34, extending into the void 32, positioned adjacent the outer retainer plate 22 to retain the outer retainer plate 22 and roller clutch assembly 20 within the outer race 12. The inner retainer plate 16 and the outer retainer plate 22 are shown in FIG. 13.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A roller clutch assembly comprising:
    an outer race with a plurality of cam surfaces circumferentially spaced apart from each adjacent cam surface having a shallow end and a deep end further radially recessed into the outer race, wherein a first slot and a second slot are disposed within the cam surface, and a void extends through the outer race;
    a first spiral lock snap ring positioned within the first slot;
    an inner race having an exterior surface, an interior surface, and an interior void, wherein the interior surface contains a plurality of teeth circumferentially spaced apart from each adjacent tooth;
    an inner retainer plate disposed adjacent the inner race;
    a cage having an outer ring and an inner ring spaced apart and interconnected by a top portion and a bottom portion extending between the outer ring and the inner ring, and a plurality of spaced apart ribs extend from the outer ring, defining a plurality of windows between each rib for receiving rollers and roller springs; and
    a second spiral lock snap ring positioned within the second slot.

2. The roller clutch assembly according to claim 1, wherein the cage is composed of metal.

3. The roller clutch assembly according to claim 1, further comprising an inner retainer plate disposed adjacent the inner race.

4. The roller clutch assembly according to claim 1, further comprising an outer retainer plate.

5. A roller clutch assembly comprising:
    an outer race with a plurality of cam surfaces circumferentially spaced apart from each adjacent cam surface having a shallow end and a deep end further radially recessed into the outer race, wherein a first slot and a second slot are disposed within the cam surface, and a void extends through the outer race;
    a first spiral lock snap ring contains an outer edge positioned within the first slot;
    an inner race having an exterior surface, an interior surface, and an interior void, wherein the interior surface contains a plurality of teeth circumferentially spaced apart from each adjacent tooth;
    an inner retainer plate disposed adjacent the inner race;
    a cage having an outer ring and an inner ring spaced apart and interconnected by a top portion and a bottom portion extending between the outer ring and the inner ring, and a plurality of spaced apart ribs extend from the outer ring, defining a plurality of windows between each rib for receiving rollers and roller springs;
    an outer retainer plate; and
    a second spiral lock snap ring contains an outer edge positioned within the second slot.

6. The roller clutch assembly according to claim 5, further comprising at least one seat is disposed between the plurality of teeth on the inner surface of the inner race.

7. The roller clutch assembly according to claim 5, further comprising three seats dispersed between the plurality of teeth on the inner surface of the inner race and spaced an equal distance apart from each other.

* * * * *